(12) United States Patent
Komurasaki et al.

(10) Patent No.: US 8,797,002 B2
(45) Date of Patent: Aug. 5, 2014

(54) CONTROL DEVICE AND CONTROL METHOD FOR A VEHICLE AC GENERATOR

(71) Applicants: Keiichi Komurasaki, Chiyoda-ku (JP); Kazunori Tanaka, Chiyoda-ku (JP); Katsuyuki Sumimoto, Chiyoda-ku (JP)

(72) Inventors: Keiichi Komurasaki, Chiyoda-ku (JP); Kazunori Tanaka, Chiyoda-ku (JP); Katsuyuki Sumimoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/685,268

(22) Filed: Nov. 26, 2012

(65) Prior Publication Data

US 2013/0335039 A1    Dec. 19, 2013

(30) Foreign Application Priority Data

Jun. 15, 2012 (JP) ................................ 2012-135569

(51) Int. Cl.
    *B60L 11/02* (2006.01)
(52) U.S. Cl.
    USPC ............................................. 322/28; 322/24
(58) Field of Classification Search
    USPC ......................................... 322/24, 25, 27, 28
    See application file for complete search history.

(56) References Cited

U.S. PATENT DOCUMENTS

| | | | | |
|---|---|---|---|---|
| 6,060,866 A | * | 5/2000 | Sada et al. | 322/59 |
| 6,271,649 B1 | * | 8/2001 | Iwatani | 322/29 |
| 6,433,519 B2 | * | 8/2002 | Taniguchi et al. | 322/28 |
| 7,106,030 B2 | * | 9/2006 | Isurin et al. | 322/59 |
| 7,183,749 B2 | * | 2/2007 | Maehara | 322/22 |
| 7,199,559 B2 | * | 4/2007 | Yanagi | 322/33 |
| 7,292,007 B2 | * | 11/2007 | Aoyama | 322/24 |
| 7,576,519 B2 | * | 8/2009 | Basic et al. | 322/24 |

FOREIGN PATENT DOCUMENTS

| | | |
|---|---|---|
| JP | 57-160335 A | 10/1982 |
| JP | 06-335298 A | 12/1994 |
| JP | 2661613 B2 | 10/1997 |
| JP | 11-146699 A | 5/1999 |
| JP | 2002-300798 A | 10/2002 |
| JP | 2006-230165 A | 8/2006 |
| JP | 2009-044911 A | 2/2009 |
| WO | 2004-049553 A1 | 6/2004 |

OTHER PUBLICATIONS

Japanese Office Action, (Preliminary Notice of Reasons for Rejection), issued Sep. 3, 2013, Patent Application No. 2012-135569.
Japanese Office Action (Preliminary Notice of Reasons for Rejection) dated Apr. 1, 2014, Patent Application No. 2012-135569.

* cited by examiner

*Primary Examiner* — Nicholas Ponomarenko
(74) *Attorney, Agent, or Firm* — Sughrue Mion, PLLC

(57) ABSTRACT

The control device including: a power transistor (502) for controlling conduction/non-conduction of a field coil (3) in accordance with an output voltage of an AC generator (1) mounted on a vehicle; an RPM detection section (511) for detecting an RPM of the AC generator (1); a drive duty setting section (510) for determining whether or not the RPM detected by the RPM detection section (511) is equal to or higher than a predetermined threshold, and reducing a conduction ratio of the field coil (3) when determining that the RPM is equal to or higher than the predetermined threshold; and a driver (504) for driving the power transistor (502) based on the conduction ratio. In this manner, the conduction ratio of the field coil (3) is reduced to suppress the drive torque.

6 Claims, 5 Drawing Sheets

CONTROL DEVICE AND CONTROL METHOD FOR A VEHICLE AC GENERATOR

BACKGROUND OF THE INVENTION

1. Field of the Invention

The present invention relates to a control device and a control method for a vehicle AC generator, and more particularly, to a control device and a control method for a vehicle AC generator to be mounted on an automobile, for example.

2. Description of the Related Art

As described in Japanese Patent No. 2661613, for example, a conventional control device for a vehicle generator detects a temperature of the generator, and controls a field current to be supplied to a field coil in accordance with the detected temperature.

In the conventional control device, electric power of the generator at low temperature can be adjusted to electric power thereof at high temperature, and drive torque of the generator at low temperature can be adjusted to drive torque thereof at high temperature. However, the suppression of the drive torque in accordance with the RPM (revolutions per minute) of the generator cannot be realized.

SUMMARY OF THE INVENTION

The present invention has been made in order to solve the above-mentioned problem, and has an object to provide a control device and a control method for a vehicle AC generator, which are capable of suppressing drive torque in accordance with an RPM of the AC generator and improving energy efficiency and are also capable of reducing magnetic sound.

According to an exemplary embodiment of the present invention, there is provided a control device for a vehicle AC generator, the control device including: a power transistor for controlling conduction/non-conduction of a field coil in accordance with an output voltage of an AC generator mounted on a vehicle; an RPM detection section for detecting an RPM of the AC generator; a drive duty setting section for determining whether or not the RPM detected by the RPM detection section is equal to or higher than a predetermined threshold, and reducing a conduction ratio of the field coil when determining that the RPM is equal to or higher than the predetermined threshold; and a driver for driving the power transistor based on the conduction ratio of the field coil output from the drive duty setting section.

According to the exemplary embodiment of the present invention, the control device for a vehicle AC generator includes: the power transistor for controlling the conduction/non-conduction of the field coil in accordance with the output voltage of the AC generator mounted on a vehicle; the RPM detection section for detecting the RPM of the AC generator; the drive duty setting section for determining whether or not the RPM detected by the RPM detection section is equal to or higher than the predetermined threshold, and reducing the conduction ratio of the field coil when determining that the RPM is equal to or higher than the predetermined threshold; and the driver for driving the power transistor based on the conduction ratio of the field coil output from the drive duty setting section. Therefore, it is possible to suppress drive torque in accordance with the RPM of the AC generator, improve energy efficiency, and reduce magnetic sound.

DETAILED DESCRIPTION OF THE PREFERRED EMBODIMENTS

First Embodiment

A control device for a vehicle AC generator according to a first embodiment of the present invention is described below. Before the description, the principle of the present invention is described with reference to graphs of FIGS. 1 to 4.

Figure 1:
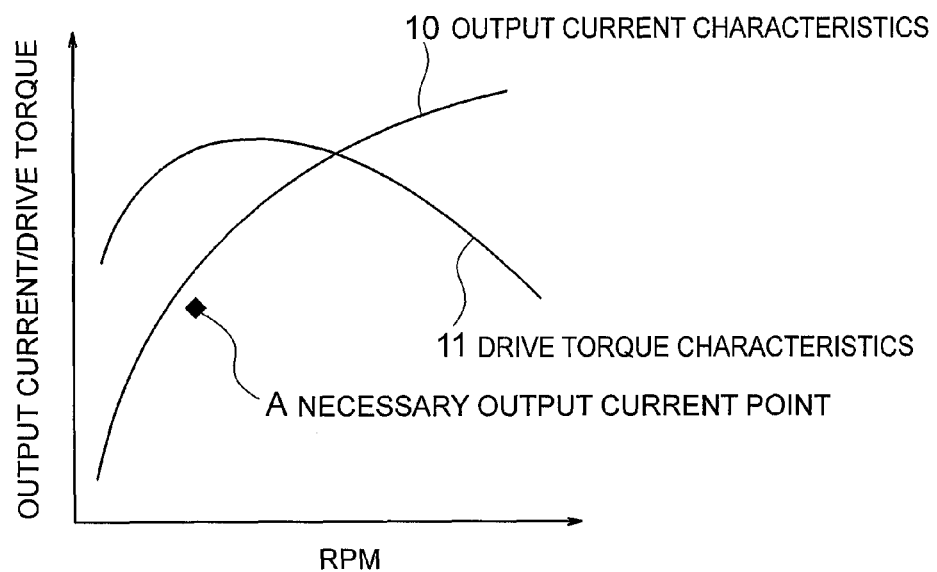
FIG. 1 is a graph showing characteristics of an output current and drive torque in a vehicle AC generator.

FIG. 1 shows a curve 10 and a curve 11 respectively representing typical characteristics of an output current and drive torque with respect to an RPM of an AC generator. The curve 10 and the curve 11 represent the characteristics for a field coil at full excitation. In FIG. 1, the vertical axis represents the output current and the drive torque of the AC generator, and the horizontal axis represents the RPM of the AC generator.

The point A of FIG. 1 indicates a point of electric power necessary for covering electric power for driving a plurality of electrical devices (electrical loads) mounted on a vehicle. As used herein, the point A is referred to as a necessary output current point whose coordinate is (Ax, Ay). The electric power balance is established when an output current represented by the coordinate Ay of the point A on the vertical axis can be ensured in a range where the RPM is higher than an RPM represented by the coordinate Ax of the point A on the horizontal axis. Note that, the coordinate Ax of the point A on the horizontal axis represents the RPM of the AC generator when an engine of the vehicle rotates at idling speed.

On the other hand, the output current of the AC generator is determined by rotational energy (RPM). Accordingly, as the RPM becomes higher, as represented by the curve 10, the output current increases, and it reaches a value exceeding the necessary output current indicated by the point A. Electric power generated by such an excessive current is excess electric power, which leads to deterioration in energy efficiency and deterioration in magnetic sound because a high output is generated.

Figure 2:
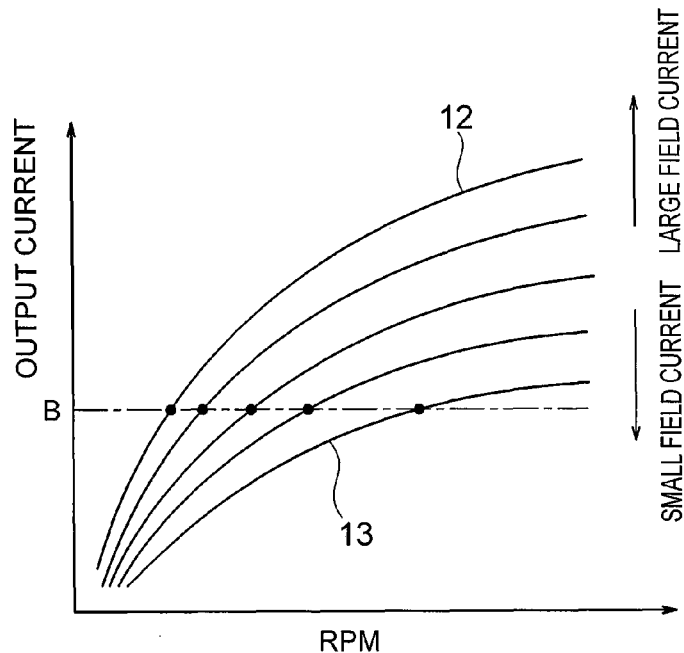
FIG. 2 is a graph showing characteristics of the output current in the vehicle AC generator, with a field current used as a parameter.

FIG. 2 shows typical characteristics of the output current with respect to the RPM of the AC generator. In FIG. 2, a field current is a parameter. Five curves of FIG. 2 represent the characteristics of the output current for five different values of the field current, respectively. A curve 12 represents the case of the largest one of the five values of the field current, and a curve 13 represents the case of the smallest one of the five values of the field current. As is understood from the five curves of FIG. 2, when the RPM is the same, the output current increases as the field current becomes larger. It is therefore found that the magnitude of the output current can be controlled by suppressing the field current. For example, in the case of obtaining an output current on the line B of FIG. 2, the output current on the line B can be obtained by controlling the value of the field current in accordance with the value of the RPM. In other words, when the RPM is high, the output current on the line B cannot be obtained unless the field current is suppressed to a low value. In contrast, when the RPM is low, the output current on the line B can be obtained even if the field current is high.

Figure 3:
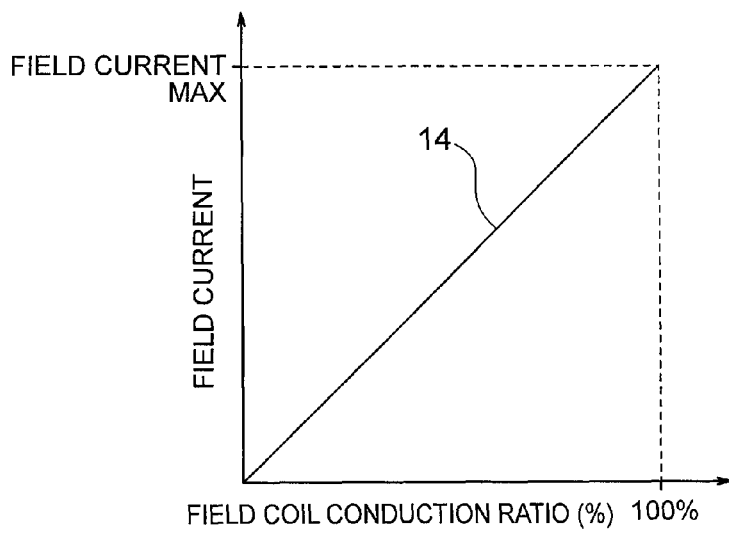
FIG. 3 is a graph showing a relationship between a conduction ratio of a field coil and the field current in the vehicle AC generator.

FIG. 3 is a graph showing a typical relationship between a conduction ratio of the field coil and the field current. In general, the field coil of the vehicle AC generator is driven at a fixed frequency to be turned ON/OFF through control of the conduction/non-conduction of the field current to be supplied to the field coil. The conduction ratio of the field coil is determined by the ratio of an ON period (ON duty). In other words, the conduction ratio of the field coil is the ratio of a conductive period (ON period) to a whole period (=conductive period (ON period)+non-conductive period (OFF period)) in the case of supplying power to the field coil (conduction ratio of field coil=conductive period/whole period). In FIG. 3, as represented by a solid line 14, the conduction ratio of the field coil has a substantially proportional relationship with the field current. Therefore, the field current can be determined by determining the conduction ratio of the field coil. In contrast, the conduction ratio of the field coil can be determined by determining the field current.

Figure 4:
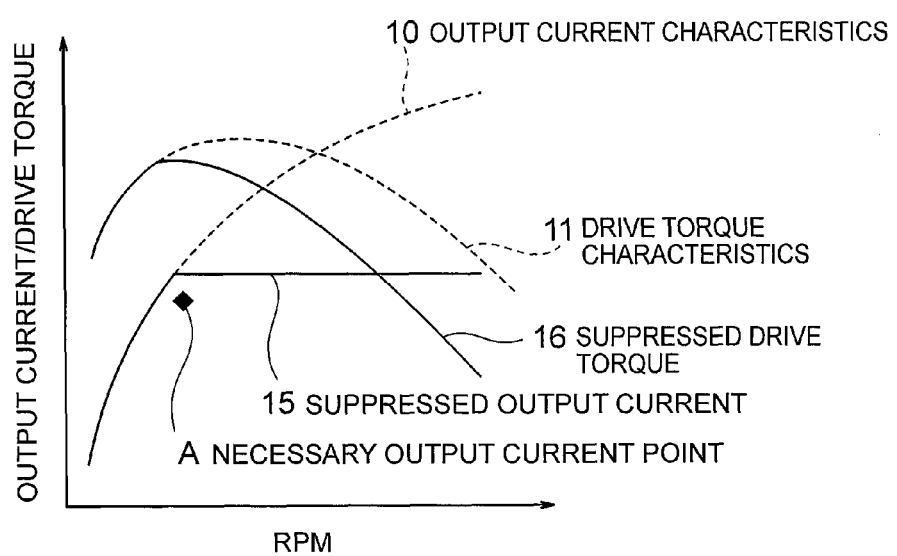
FIG. 4 is a graph showing characteristics of an output current and drive torque in a vehicle AC generator according to first to fifth embodiments of the present invention.

FIG. 4 shows characteristics to be obtained by the present invention. In general, as represented by the curve 10 of FIG. 1, the output current increases along with the increase in RPM. However, the generation of electric power larger than the necessary output current point indicated by the point A is wasteful. Therefore, in the present invention, the field current is suppressed when the RPM is in the range higher than the coordinate Ax of the point A on the horizontal axis. The value of the RPM at the point A may be set as a threshold of the RPM for starting suppressing the field current. In fact, however, there is a slight error, and hence, as shown in FIG. 4, the threshold is set to an RPM at the position of the turn of a solid line 15 of FIG. 4. The threshold is therefore set to an RPM at which the output current becomes slightly higher than that at the point A. Accordingly, when the RPM is in the range equal to or higher than the threshold, the output current is suppressed from a dotted curve 10 of FIG. 4 to a suppressed output current line represented by the solid line 15 of FIG. 4. In this way, the output current is controlled to follow the suppressed output current line represented by the solid line 15 of FIG. 4, and hence the generation of excess electric power can be reduced so that the drive torque can be suppressed from a dotted curve 11 of FIG. 4 to a solid curve 16 (suppressed drive torque). Thus, excess energy for driving the AC generator can be reduced.

Figure 5:
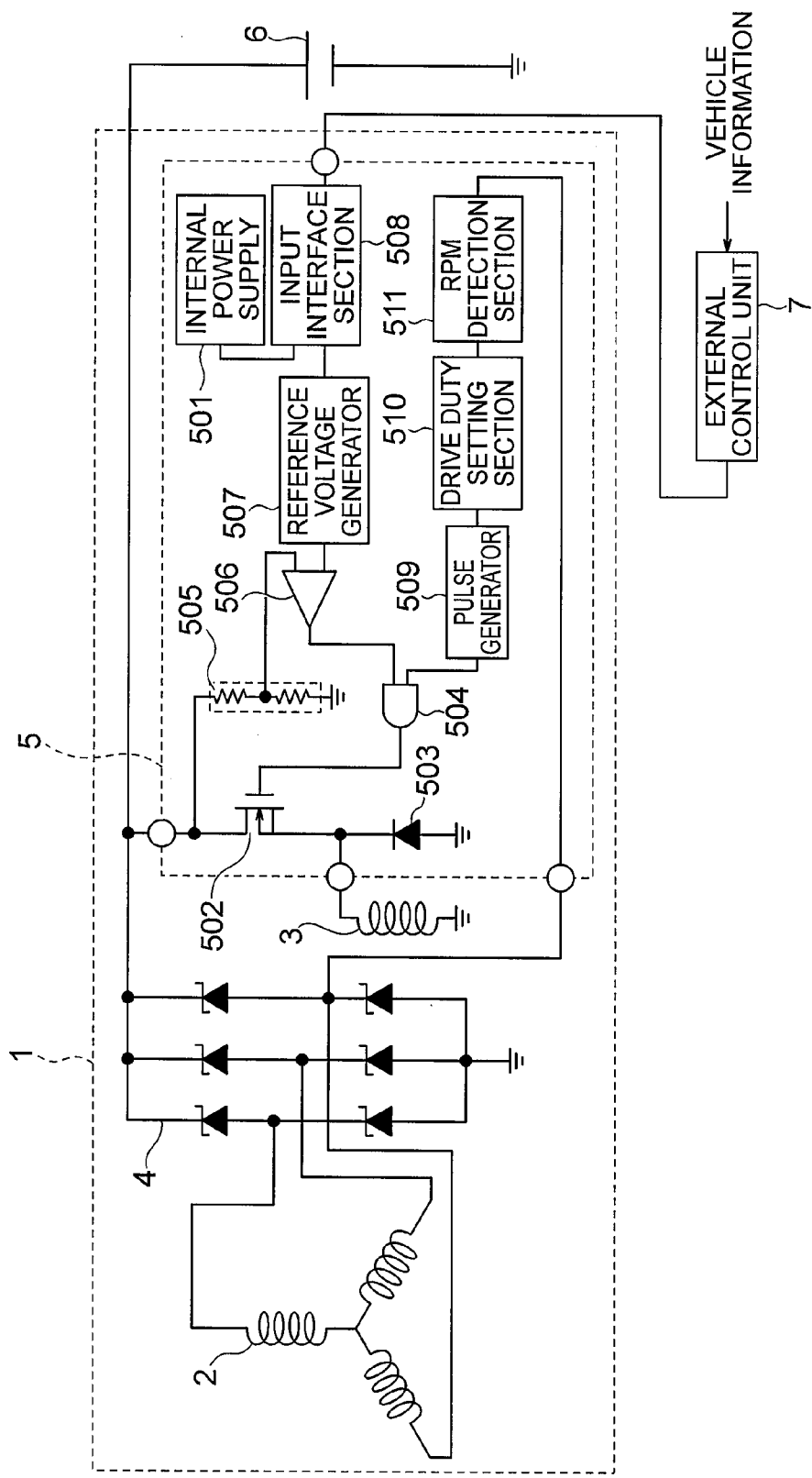
FIG. 5 is a configuration diagram illustrating a configuration of a control device for a vehicle AC generator according to the first, second, and fifth embodiments of the present invention.

FIG. 5 is a diagram illustrating configurations of the vehicle AC generator and the control device therefor according to the first embodiment of the present invention. In FIG. 5, reference numeral 1 denotes a vehicle AC generator (hereinafter referred to as AC generator 1). The AC generator 1 is mounted on an engine (not shown) of a vehicle, and drive power is transmitted to the AC generator 1 from a crankshaft of the engine via a belt. In this way, the AC generator 1 obtains the drive power from the engine to generate electric power.

In FIG. 5, reference numeral 2 denotes a stator coil. The stator coil 2 generates an AC output. Reference numeral 3 denotes a field coil (field winding). The field coil 3 generates a magnetic flux necessary for electric power generation. Reference numeral 4 denotes a rectifier. The rectifier 4 has a three-phase full-wave rectifying configuration for converting the AC output generated by the stator coil 2 into a DC. Reference numeral 5 denotes a controller for controlling the output of generated electric power of the AC generator 1 (The controller 5 is the control device for a vehicle AC generator of the present invention). The controller 5 is hereinafter referred to as a regulator 5. In the AC generator 1, the stator coil 2, the field coil 3, the rectifier 4, and the regulator 5 are provided.

Reference numeral 6 denotes a battery (on-board battery). As the battery 6, in general, a lead-acid battery or the like is used. The battery 6 is connected to the AC generator 1, and stores electric power generated by the AC generator 1. Reference numeral 7 denotes an external control unit connected to the AC generator 1. The external control unit 7 controls an electric power generation state of the AC generator 1. For example, the external control unit 7 instructs the regulator 5 to switch a control voltage based on vehicle information such as an engine state, a vehicle running state, an accelerator opening degree, and a brake pedal pressing state.

In the regulator 5, there are provided an internal power supply 501, a power transistor 502, a diode 503, a driver 504, a voltage detection resistor 505, a voltage comparator 506, a reference voltage generator 507, an input interface section 508, a pulse generator 509, a drive duty setting section 510, and an RPM detection section 511.

The internal power supply 501 is activated in response to a signal input from the external control unit 7 as a trigger, and supplies power to the inside of the regulator 5.

The power transistor 502 controls ON/OFF of the field coil 3, and drives the field coil 3. The power transistor 502 is an output stage of the regulator 5. When the power transistor 502 is turned ON, a field current is supplied to the field coil 3 to generate electric power. When the power transistor 502 is turned OFF, a field current is not supplied, and electric power is not generated.

The diode 503 is connected in parallel to the field coil 3, and absorbs a surge generated when the field coil 3 is turned OFF.

The driver 504 drives the power transistor 502. The driver 504 drives the power transistor 502 only when the output of the voltage comparator 506 and the output of the pulse generator 509 are both Hi.

The voltage detection resistor 505 is connected to a DC output line of the rectifier 4, and has a configuration of dividing the voltage of the rectifier 4 to detect an output voltage of the AC generator 1.

The voltage comparator 506 compares the detected voltage of the voltage detection resistor 505 with a reference voltage to be described below. When the detected voltage is lower than the reference voltage, the voltage comparator 506 outputs Hi. In other words, when the detected voltage is low, the power transistor 502 is allowed to be conductive to increase the conduction ratio of the field coil 3.

For such voltage control, the reference voltage generator 507 generates a linearly controllable reference voltage in the range of 12 V to 15 V, for example. The control value is instructed by the external control unit 7.

The input interface section 508 receives an instruction signal from the external control unit 7, and discriminates the instruction signal into a power supply activation signal and a voltage control signal. The input interface section 508 inputs the power supply activation signal to the internal power supply 501, and inputs the voltage control signal to the reference voltage generator 507.

The pulse generator 509 converts the output of the drive duty setting section 510 into a pulse signal constituted of Hi and Lo.

The drive duty setting section 510 determines based on a rotation signal of the RPM detection section 511 whether or not the RPM of the AC generator 1 has reached a predetermined threshold or higher. When the RPM has reached the predetermined threshold or higher, in order to suppress the conduction ratio of the field coil 3, the drive duty setting section 510 sets the conduction ratio to a predetermined value which is preset and lower than the current value.

The RPM detection section 511 detects the RPM of the AC generator 1 based on a single-phase half-wave waveform of the stator coil 2, and outputs the detected RPM as an RPM signal to the drive duty setting section 510.

Next, the operation of the control device (regulator 5) for the AC generator 1 according to the first embodiment of the present invention is described.

First, the external control unit 7 outputs a power supply activation signal as an instruction signal.

In response to the instruction signal, the input interface section 508 determines that the instruction signal is the power supply activation signal, and outputs the power supply activation signal to the internal power supply 501.

In this way, the internal power supply 501 receives the power supply activation signal from the external control unit 7 via the input interface section 508. The internal power supply 501 is activated in response to the power supply activation signal as a trigger, and supplies power to the inside of the regulator 5.

Next, the voltage detection resistor 505 detects the voltage of the AC generator 1, and inputs the detected voltage to the voltage comparator 506.

Further, the reference voltage generator 507 receives a voltage control signal from the external control unit 7 via the input interface section 508. The reference voltage generator 507 generates a reference voltage based on the voltage control signal from the external control unit 7, and inputs the reference voltage to the voltage comparator 506.

The voltage comparator 506 compares the detected voltage from the voltage detection resistor 505 and the reference voltage from the reference voltage generator 507. As a result of the comparison, when the detected voltage is lower than the reference voltage, the voltage comparator 506 outputs a Hi signal to the driver 504. On the other hand, when the detected voltage is equal to or higher than the reference voltage, the voltage comparator 506 outputs a Lo signal or does not output a signal.

Further, the RPM detection section 511 detects the RPM of the AC generator 1.

The drive duty setting section 510 determines based on a rotation signal of the RPM detection section 511 whether or not the RPM of the AC generator 1 is equal to or higher than a predetermined threshold. When the RPM has reached the predetermined threshold or higher, the drive duty setting section 510 switches the conduction ratio of the field coil 3 to a predetermined value which is preset and lower than the current value. Note that, as described above, it is desired to set the threshold to an RPM at which an output current slightly higher than the output current at the point A of FIG. 4 can be obtained.

The pulse generator 509 generates a pulse signal constituted of a Hi/Lo signal based on the conduction ratio input from the drive duty setting section 510, and inputs the pulse signal to the driver 504. Note that, it is sufficient that the ratio of a period during which the pulse signal is a Hi signal is equal to the conduction ratio, and hence the width of the pulse or the number of pulses is controlled so that the ratio of the period during which the pulse signal is a Hi signal may be equal to the conduction ratio.

The driver 504 drives the power transistor 502 only when the signal from the voltage comparator 506 is a Hi signal and the signal from the pulse generator 509 is a Hi signal. Note that, the driver 504 does not drive the power transistor 502 when at least one of the signal from the voltage comparator 506 and the signal from the pulse generator 509 is a Lo signal.

The power transistor 502 controls ON/OFF of the field coil 3 in accordance with a drive signal from the driver 504. As shown in FIG. 3, the conduction ratio and the field current have a substantially proportional relationship. Therefore, when the drive duty setting section 510 switches the conduction ratio, the field current of the field coil 3 is controlled.

As described above with reference to FIG. 2, the magnitude of the output current is determined by the magnitude of the field current, and hence, by switching the conduction ratio to suppress the field current when the RPM is in the range equal to or higher than a predetermined threshold, the magnitude of the output current can be ensured to be on the suppressed output current line represented by the solid line 15 of FIG. 4. As shown in FIG. 4, the value of the suppressed output current represented by the solid line 15 is larger than the value of the output current at the point A, which is therefore sufficient for covering electric power of electrical loads of the vehicle.

Through the above-mentioned operation, when the RPM of the AC generator 1 has reached a predetermined threshold or higher, the conduction ratio of the field coil 3 is switched to a predetermined value lower than the value of the current conduction ratio to control the field current of the field coil 3. Thus, the output current of the AC generator 1 in the range where the RPM is equal to or higher than the predetermined threshold can be controlled to a constant value, thus reducing drive energy.

As described above, the control device for a vehicle AC generator according to the first embodiment of the present invention includes the power transistor 502 for controlling the conduction/non-conduction of the field coil 3 in accordance with the output voltage of the AC generator 1 mounted on a vehicle, the RPM detection section 511 for detecting the RPM of the AC generator 1, the drive duty setting section 510 for determining whether or not the RPM detected by the RPM detection section 511 is equal to or higher than a predetermined threshold, and reducing the conduction ratio of the field coil 3 when determining that the RPM is equal to or higher than the predetermined threshold, and the driver 504 for driving the power transistor 502 based on the conduction ratio of the field coil 3 output from the drive duty setting section 510. In the range where the RPM is equal to or higher than a predetermined value, the conduction ratio of the field coil 3 of the AC generator 1 is suppressed. Therefore, in the region where the output electric power is equal to or higher than output electric power necessary for a vehicle, the generated electric power of the AC generator 1 is suppressed, to thereby increase the energy efficiency of the AC generator 1 and suppress wasteful drive torque. Thus, fuel efficiency of the engine can be increased. In addition, magnetomotive force of the field coil 3 is reduced in a high-speed range of the RPM, and hence uncomfortable magnetic sound of the AC generator 1 can be reduced.

Second Embodiment

A vehicle AC generator (AC generator 1) and a control device (regulator 5) therefor according to a second embodiment of the present invention have the same configurations as in FIG. 5. The second embodiment is different from the first embodiment in the operation of the drive duty setting section 510.

The first embodiment has described an example in which, when the RPM of the AC generator 1 has reached a predetermined value or higher, the drive duty setting section 510 switches the conduction ratio of the field coil 3 to a predetermined value lower than the current value. However, the RPM and the field current have the relationship shown in FIG. 2, and hence, when the drive duty setting section 510 is configured to switch the conduction ratios sequentially in accordance with the RPM, the magnitude of the output current can be controlled to the suppressed output current line represented by the solid line 15 of FIG. 4 more accurately. Specifically, the drive duty setting section 510 sequentially reduces the conduction ratios along with the increase in RPM so that the magnitude of the output current may follow the suppressed output current line represented by the solid line 15 of FIG. 4.

Note that, the value of the conduction ratio can be determined using, for example, a map in which the conduction ratio is preset for each RPM.

As shown in FIG. 2, the magnitude of the output current is determined by the field current and the RPM. In other words, when the RPM is high, an output current equal to or smaller than the line B cannot be obtained unless the field current is reduced, and, on the other hand, when the RPM is low, the output current equal to or smaller than the line B can be obtained even if the field current is high. Further, as shown in FIG. 3, the field current and the conduction ratio have a substantially proportional relationship. Accordingly, when the drive duty setting section 510 is configured to sequentially switch the conduction ratios of the field coil 3 by using the RPM as a parameter and thereby control the field current, the magnitude of the output current can be controlled accurately so as to follow the line B of FIG. 2. The same holds true for the suppressed output current line represented by the solid line 15 of FIG. 4. Therefore, in the range where the RPM is equal to or higher than a predetermined threshold, the drive duty setting section 510 sequentially switches the conduction ratios of the field coil 3 by using the RPM as a parameter and thereby controls the field current. In this way, the magnitude of the output current can be controlled accurately so as to follow the suppressed output current line represented by the solid line 15 of FIG. 4. The values of the line B of FIG. 2 and the suppressed output current line of FIG. 4 are larger than the value of the output current at the point A of FIGS. 1 and 4, which are therefore sufficient for covering electric power of electrical devices of the vehicle.

As described above, in the second embodiment, the same effects as in the first embodiment can be obtained. In addition, in the second embodiment, when the RPM has reached a predetermined threshold or higher, the conduction ratios of the field coil 3 are sequentially changed using the RPM detected by the RPM detection section 511 as a parameter. Therefore, the conduction ratio of the field coil 3 can be changed in accordance with the RPM so that generated electric power can be controlled to a constant necessary value. Thus, the drive torque can be reduced efficiently.

Third Embodiment

Figure 6:
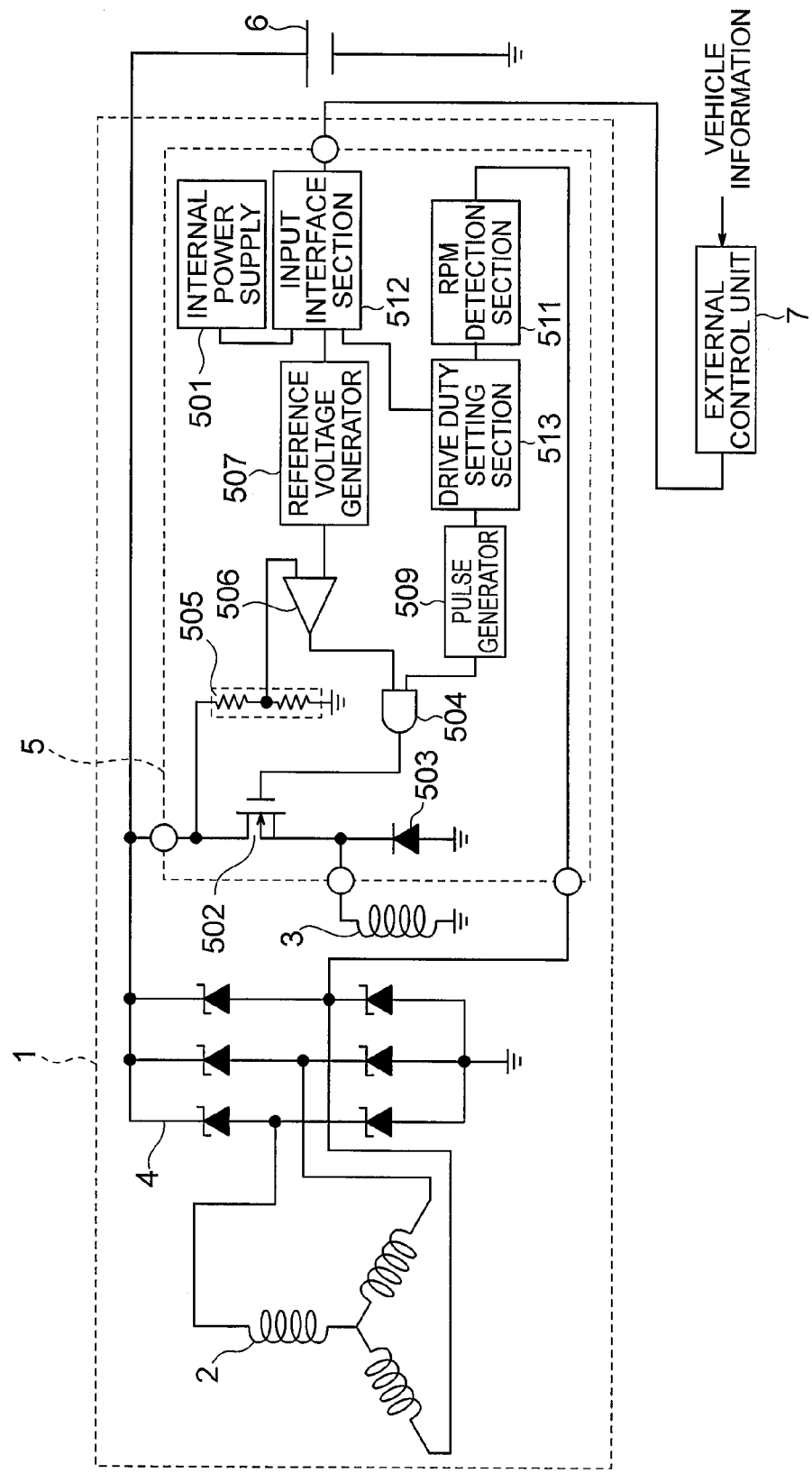
FIG. 6 is a configuration diagram illustrating a configuration of a control device for a vehicle AC generator according to the third embodiment of the present invention.

FIG. 6 is a diagram illustrating configurations of a vehicle AC generator (AC generator 1) and a control device (regulator 5) therefor according to a third embodiment of the present invention. As illustrated in FIG. 6, in the third embodiment, an input interface section 512 is provided instead of the input interface section 508 of FIG. 5. Further, a drive duty setting section 513 is provided instead of the drive duty setting section 510 of FIG. 5. In the third embodiment, the input interface section 512 is connected to the internal power supply 501 and the reference voltage generator 507 and also to the drive duty setting section 513. The other configurations are the same as in FIG. 5, and hence descriptions thereof are herein omitted. The operation different from the first embodiment is mainly described below.

The input interface section 508 in the first embodiment has the discrimination function of discriminating between two signals of the power supply activation signal and the voltage control signal. In the third embodiment, however, the input interface section 512 has a function of discriminating among three signals of the power supply activation signal, the voltage control signal, and a conduction ratio setting instruction for the field coil 3. When the input interface section 512 receives the conduction ratio setting instruction from the external control unit 7, the input interface section 512 generates a conduction ratio setting signal based on the conduction ratio setting instruction, and outputs the conduction ratio setting signal to the drive duty setting section 513. The operations of the input interface section 512 performed when the power supply activation signal and the voltage control signal are received are the same as those of the input interface section 508.

The drive duty setting section 513 sets the conduction ratio of the field coil 3 based on the conduction ratio setting signal from the input interface section 512.

In the third embodiment, when the control of the conduction ratio described in the first embodiment is performed, if an event to change the conduction ratio to a value slightly higher than the current value occurs due to another factor than the output current, the external control unit 7 detects the event and outputs a conduction ratio setting instruction for specifying an increment (or decrement) of the conduction ratio. In this way, the conduction ratio of the field coil 3 can be changed to be increased (or decreased). An example of the event includes the case where the battery 6 is in an overdischarge state and more charged electric power is needed. In the case of this example, the external control unit 7 detects the event and determines the increment of the conduction ratio, and the external control unit 7 outputs a conduction ratio setting instruction for specifying the increment of the conduction ratio to change the conduction ratio of the field coil 3 to a value higher by the increment. In this way, the charged state of the battery 6 can be recovered quickly. Note that, an excessive increment of the conduction ratio leads to the increase in output current, and hence the external control unit 7 calculates such an appropriate increment that the event is solved and the output current is not increased. Alternatively, the external control unit 7 may control the conduction ratio by feedback control.

As described above, in the third embodiment, the same effects as in the first embodiment can be obtained. In addition, in the third embodiment, the conduction ratio of the field coil 3 can be changed from the outside (external control unit 7). Therefore, for example, when the battery 6 is in an overdischarged state and more charged electric power is needed, the conduction ratio of the field coil 3 is changed in response to an instruction from the outside (external control unit 7). In this way, the amount of electric power to the battery 6 can be increased so that the charged state of the battery 6 can be recovered quickly.

Fourth Embodiment

Figure 7:
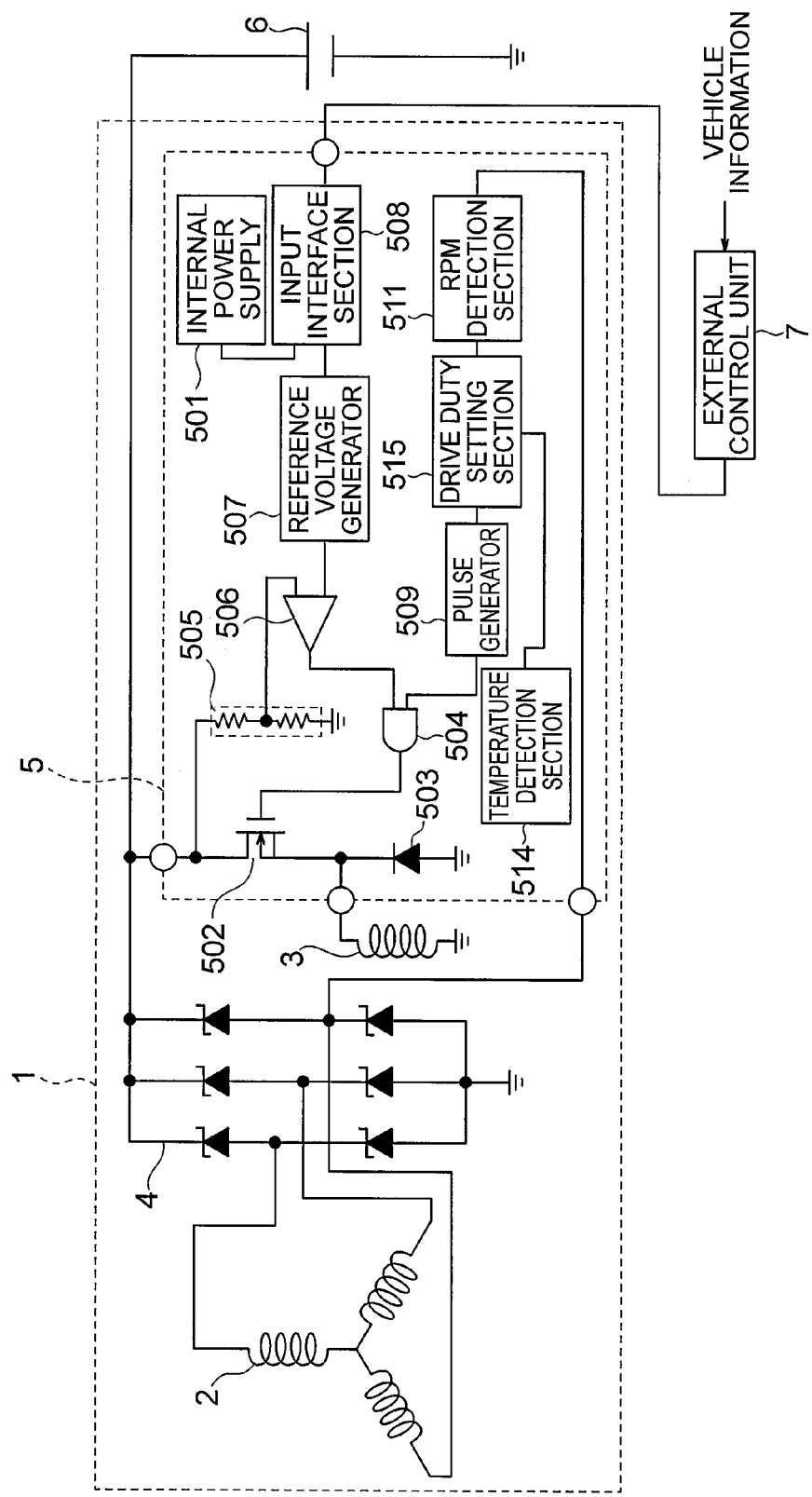
FIG. 7 is a configuration diagram illustrating a configuration of a control device for a vehicle AC generator according to the fourth embodiment of the present invention.

FIG. 7 is a diagram illustrating configurations of a vehicle AC generator (AC generator 1) and a control device (regulator 5) therefor according to a fourth embodiment of the present invention. As illustrated in FIG. 7, in the fourth embodiment, a drive duty setting section 515 is provided instead of the drive duty setting section 510 of FIG. 5. Further, a temperature detection section 514 is added. The temperature detection section 514 is connected to the drive duty setting section 515. The other configurations are the same as in FIG. 5, and hence descriptions thereof are herein omitted.

The temperature detection section 514 detects temperature of the AC generator 1. As the temperature detection section 514, for example, a temperature detection section provided in an integrated circuit (IC) of the regulator 5 may be used.

The drive duty setting section 515 changes the conduction ratio of the field coil 3 in accordance with the detected temperature input from the temperature detection section 514. The drive duty setting section 515 increases the conduction ratio when the temperature of the AC generator 1 has increased to thereby increase the resistance value of the field coil 3 during the control of the conduction ratio described above in the first embodiment. On the other hand, the drive duty setting section 515 reduces the conduction ratio when the temperature of the AC generator 1 has decreased to decrease the resistance value of the field coil 3. In this manner, the change in output current caused by the temperature is suppressed.

As an example of the method of changing the conduction ratio, the drive duty setting section 515 may have a correction coefficient for temperature with respect to the conduction ratio of the field coil 3 in advance, and may change the conduction ratio with the use of the correction coefficient.

The field coil 3 is formed by winding a copper wire. Accordingly, the temperature of the copper wire increases by the increase in temperature of the AC generator 1. The field current of the field coil 3 changes by the change in resistance value of the field coil 3 caused by a temperature coefficient of the copper wire, with the result that generated electric power of the AC generator 1 changes. Therefore, when the drive duty setting section 515 has the temperature coefficient of the copper wire stored therein in advance, and corrects the conduction ratio with the use of the temperature coefficient in accordance with the detected temperature of the temperature detection section 514, the change in generated electric power caused by the increase in temperature can be suppressed.

As described above, in the fourth embodiment, the same effects as in the first embodiment can be obtained. In addition, in the fourth embodiment, the temperature detection section 514 for detecting the temperature of the AC generator 1 is connected to the drive duty setting section 515, and the conduction ratio is corrected in accordance with the detected temperature. Thus, the fluctuation in output current caused by the change in temperature of the AC generator 1 can be suppressed.

Fifth Embodiment

A vehicle AC generator (AC generator 1) and a control device (regulator 5) therefor according to a fifth embodiment of the present invention have the same configurations as in FIG. 5.

In the fifth embodiment, in the configuration of FIG. 5, the drive duty setting section 510 of the regulator 5 includes a non-volatile memory (storage device). In the non-volatile memory, a plurality of conduction ratios are stored in advance, and the conduction ratio can be selected from among the plurality of conduction ratios. For example, there are various types (models) of the AC generators 1, and hence the conduction ratios corresponding to the types are stored in the non-volatile memory in advance, and the conduction ratio is switched in accordance with the type of the AC generator 1 to be used. The other configurations and operations are the same as in the first embodiment.

As described above, in the fifth embodiment, a plurality of conduction ratios are stored in the non-volatile memory included in the drive duty setting section 510 in advance, and the conduction ratio can be selected in accordance with the model of the AC generator 1. Thus, it is possible to support a plurality of AC generators 1 (model variations) by a single type of regulator.

A specific operation is described. The regulator 5 is mounted in the AC generator 1 at the manufacture of a vehicle or at the shipment of a vehicle. In the non-volatile memory included in the drive duty setting section 510 of the regulator 5, as described above, a plurality of conduction ratios corresponding to a plurality of types of AC generators 1 are stored in advance. Accordingly, in response to an operation from the external control unit 7 before the regulator 5 is mounted in the AC generator 1, the conduction ratio is selected from the non-volatile memory in accordance with the type of the AC generator 1 to be set.

As described above, in the fifth embodiment, the same effects as in the first embodiment can be obtained. In addition, in the fifth embodiment, the conduction ratios corresponding to a plurality of types of AC generators 1 are stored in the regulator 5 in advance, and, in response to an external operation before the regulator 5 is mounted in the AC generator 1, the conduction ratio is set in accordance with the type of the AC generator 1. Thus, a large number of types of AC generators can be supported by a single type of regulator.

Note that, in the above description, the conduction ratio is set in response to an external operation before the regulator 5 is mounted in the AC generator 1, but the configuration is not limited to this case. It is also possible to switch the conduction ratio by an external operation even after the regulator 5 is mounted in the AC generator 1.

What is claimed is:

1. A control device for a vehicle AC generator, the control device comprising:
    a power transistor for controlling conduction/non-conduction of a field coil in accordance with an output voltage of an AC generator mounted on a vehicle;
    an RPM detection section for detecting an RPM of the AC generator;
    a drive duty setting section for determining whether or not the RPM detected by the RPM detection section is equal to or higher than a predetermined threshold, and reducing a conduction ratio of the field coil when determining that the RPM is equal to or higher than the predetermined threshold; and
    a driver for driving the power transistor based on the conduction ratio of the field coil output from the drive duty setting section.

2. A control device for a vehicle AC generator according to claim 1, wherein:
    the drive duty setting section switches the conduction ratio in accordance with an increase/decrease in the RPM; and
    when the RPM has increased, the drive duty setting section reduces the conduction ratio based on the increase in the RPM, and, when the RPM has decreased, the drive duty setting section increases the conduction ratio based on the decrease in the RPM, to thereby control generated electric power of the AC generator to a substantially constant value.

3. A control device for a vehicle AC generator according to claim 1, further comprising an external control unit connected to the drive duty setting section, for instructing an increment/decrement of the conduction ratio.

4. A control device for a vehicle AC generator according to claim 1, further comprising a temperature detection section for detecting temperature of the AC generator, wherein:
- the drive duty setting section switches the conduction ratio in accordance with a fluctuation in the temperature detected by the temperature detection section; and
- when the detected temperature becomes higher, the drive duty setting section increases the conduction ratio based on an increase in the detected temperature, and, when the detected temperature becomes lower, the drive duty setting section reduces the conduction ratio based on a decrease in the detected temperature.

5. A control device for a vehicle AC generator according to claim 3, further comprising a storage device which is connected to the external control unit and has a plurality of types of increments/decrements of the conduction ratio stored therein in advance.

6. A control method for a vehicle AC generator, comprising:
- an RPM detection step of detecting an RPM of an AC generator mounted on a vehicle;
- a determination step of determining whether or not the RPM detected in the RPM detection step is equal to or higher than a predetermined threshold;
- a conduction ratio setting step of reducing a conduction ratio of a field coil when it is determined in the determination step that the RPM is equal to or higher than the predetermined threshold; and
- a step of controlling conduction/non-conduction of the field coil based on the conduction ratio set in the conduction ratio setting step.

* * * * *